July 7, 1942. K. J. JACKSON 2,289,015
PINEAPPLE TRIMMING APPARATUS
Original Filed Jan. 3, 1940 2 Sheets-Sheet 1
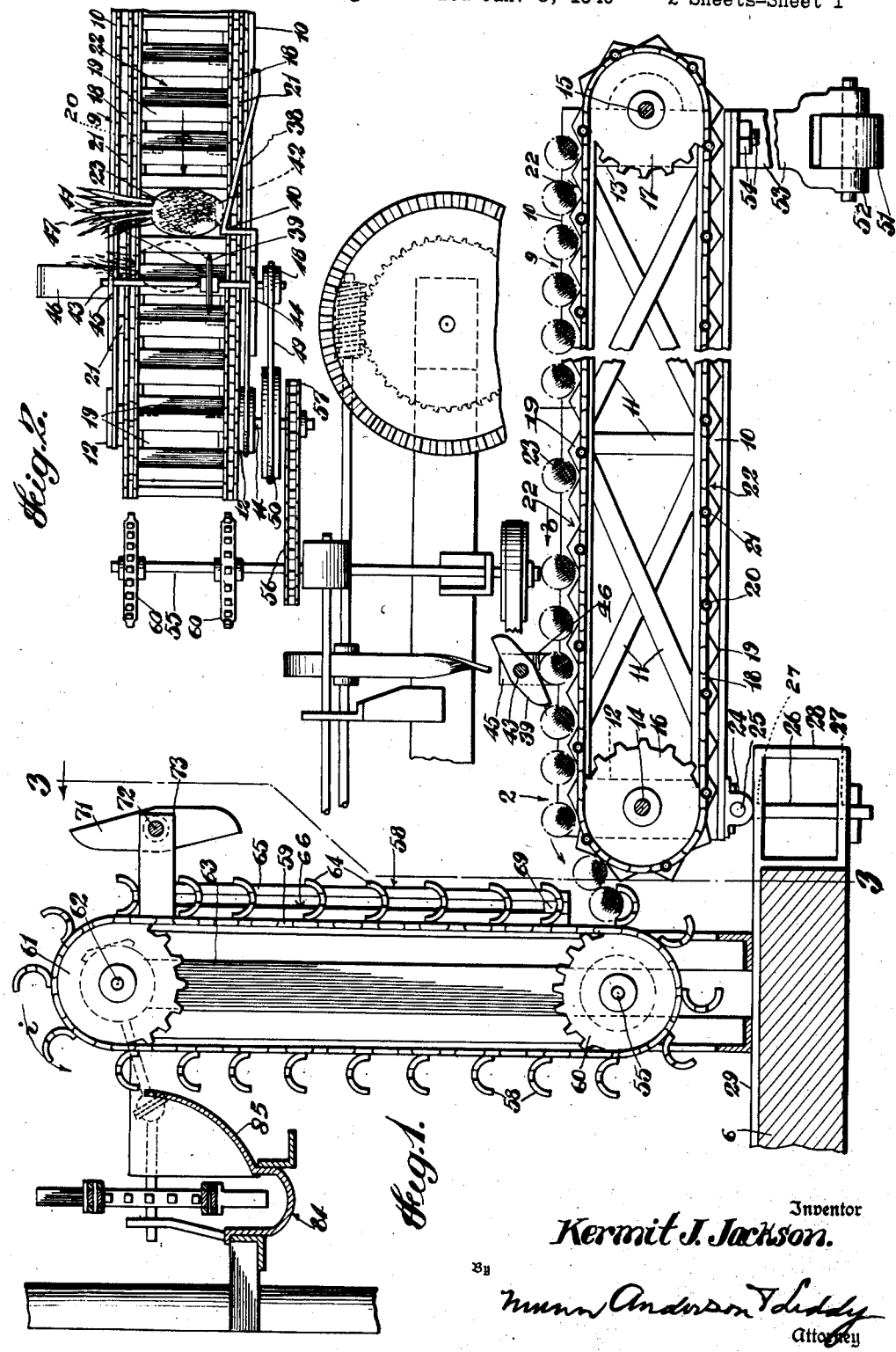
Inventor
Kermit J. Jackson.

July 7, 1942.  K. J. JACKSON  2,289,015
PINEAPPLE TRIMMING APPARATUS
Original Filed Jan. 3, 1940   2 Sheets-Sheet 2
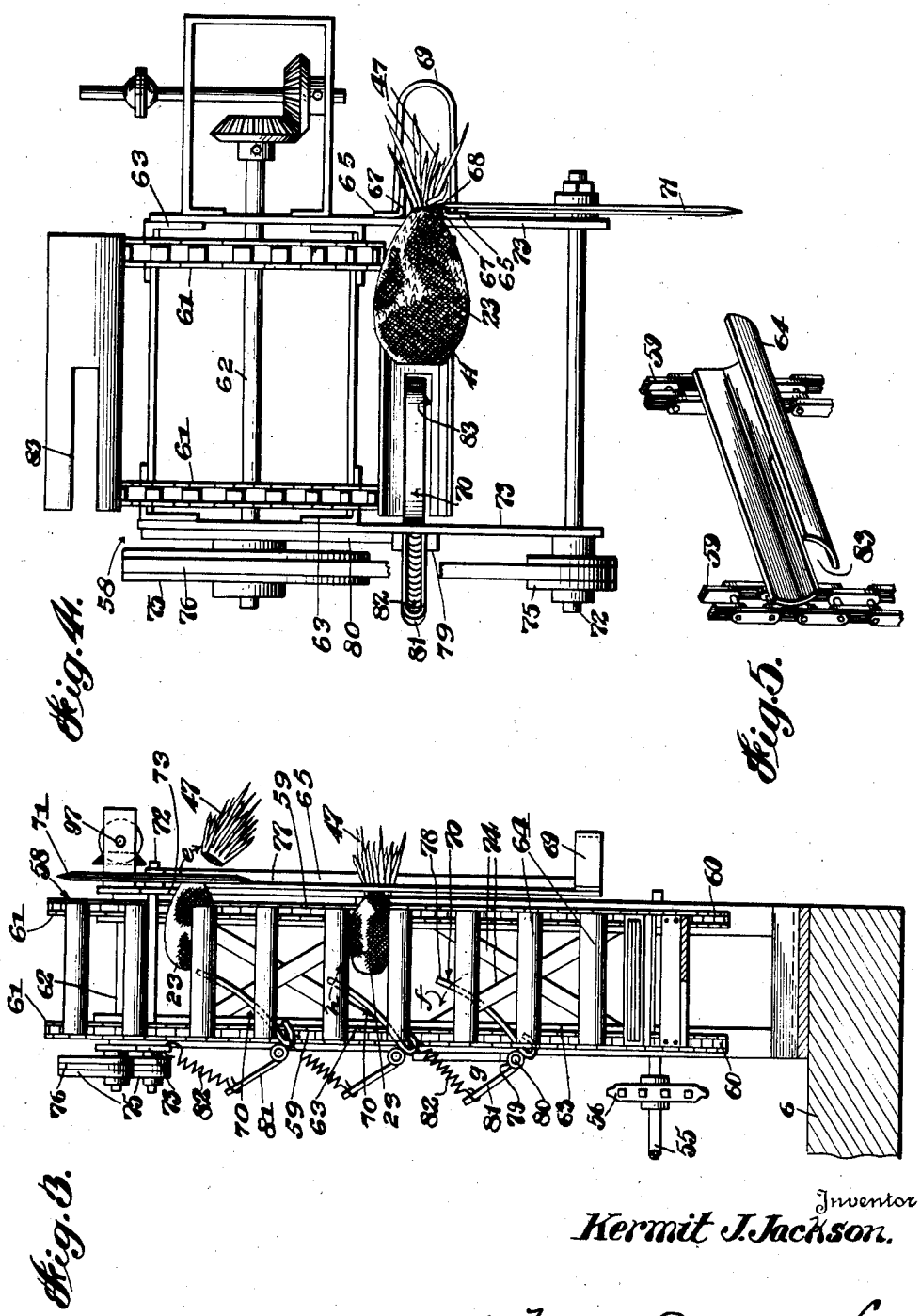
Inventor
*Kermit J. Jackson.*

Patented July 7, 1942

2,289,015

UNITED STATES PATENT OFFICE 2,289,015

PINEAPPLE TRIMMING APPARATUS

Kermit J. Jackson, Honolulu, Territory of Hawaii

Original application January 3, 1940, Serial No. 312,276. Divided and this application November 5, 1940, Serial No. 364,451

7 Claims. (Cl. 146—6)

This invention relates to improvements in trimming means which comprises part of an apparatus used in conjunction with an apparatus for harvesting pineapples. As fully brought out in an application for patent for Pineapple harvesters, filed by Kermit J. Jackson, January 3, 1940, Serial No. 312,276, of which application the instant application is a division, the foregoing harvester is employed as a follower for the workmen who pick the pines from the plant and then manually emplace them upon a gathering conveyor.

It is not within the province of the present application to enlarge upon the details of the pineapple harvester excepting insofar as it concerns the apparatus for trimming the pineapples. As these are gathered in the manner stated they are so handled by the apparatus that the root and foliage ends are removed with clean cuts. With this preamble in mind the objects of the invention are as follows:

First, to provide a pineapple trimming apparatus which is capable of employment on the field for the purpose of trimming off the root and foliage ends of the pineapples so as to make the fruit ready for subsequent handling prior to canning.

Second, to provide an effective arrangement of rotary knives for trimming the butt or root and foliage ends of the pineapples as they traverse the gathering conveyor and the elevator on their way to certain grading apparatus.

Third, to synchronize the buckets of the foregoing elevator with the gathering conveyor so that the dumping of the individual pineapples into the elevator by the gathering conveyor will not cut or bruise the fruit.

Other objects and advantages will appear in the following specification, reference being had to the accompanying drawings, in which:

Figure 1 is a cross section of a portion of a pineapple harvester particularly illustrating the gathering conveyor and the elevator immediately concerned with the instant trimming apparatus.

Figure 2 is a detail plan view of a portion of the gathering conveyor illustrating the primary trimming knife.

Figure 3 is a partially elevational and sectional view of the fruit elevator as seen on the plane 3—3 in Fig. 1.

Figure 4 is a plan view of the structure shown in Fig. 3.

Figure 5 is a perspective view of one of the elevator troughs or buckets in Fig. 3.

As has been stated before, the instant apparatus forms part of a pineapple harvester which is used in conjunction with taking up the pines and preparing them for removal from the field. The socalled harvester does not actually cut the pineapples from the plants because this is done by the workmen. The harvesting apparatus 2 which is shown herein only in part, is transported across a field of pineapples longitudinally of the rows of plants, and as the pineapples are cut they are emplaced upon a gathering conveyor.

For the purposes of the invention the apparatus 2 is mounted upon a base 6 (Figs. 1 and 3) which in practice is suitably wheeled so as to run on the surface of the field. The apparatus 2 includes at least one of the foregoing gathering conveyors 9 which serves as a place of deposit of the pineapples as they are picked from the plant.

The conveyor 9 extends laterally of the apparatus 2 like a long boom and because of that relationship it traverses the rows so as to be in the most convenient position possible. The conveyor 9 comprises a framework which consists fundamentally of four angle irons 10. These angle irons are arranged in upper and lower pairs in which relationship they are held by a system of bracing 11 (Fig. 1). This bracing includes headers 12, 13 (Fig. 1) which provide the supports for cross shafts 14, 15. Said shafts carry pairs of sprocket wheels 16, 17, to which chains 18 are applied.

The distance between these chains is spanned by cross sectionally triangular cross pieces 19 of hard wood (Figs. 1 and 2). These cross pieces are appropriately affixed to parts of the chains 18, pins 20 being used periodically to function as the securing means as well as the trunnions of rollers 21. These rollers run upon the uppermost pair of angle irons 10 and thus relieve the conveyor 9 of much of the drag which would otherwise occur.

The purpose in making the cross pieces 9 of triangular form is to define a series of pockets 22 (Fig. 1) into which the pineapples 23 are deposited by the workmen as they follow the mechanism. To the foregoing end of utilizing the cross pieces 19 as pockets, it is noted that said cross pieces are spaced longitudinally. This spacing is of a predetermined distance and match as the spacing of certain troughs of a fruit elevator presently described.

It is observed in Fig. 1 that the lower flight of the conveyor 9 is not permitted to sag. This would be objectionable because of the length of the gathering conveyor. The arrangement is such that the cross pieces 19 are permitted to drag along the lower pair of angle irons 10. The rollers 21 do not ride these angle irons as in the case of the top flight, but it is readily conceivable that they could be made to do so.

A pair of bearings 24 of which one is shown in Fig. 1, provide the support for the horizontal arm 25 of a T, the vertical stem 26 of which is turnably set in holes 27 of an extension 28 from the base 6. This extension is part of a metal plate 29 which goes across on top of the back of the base. The mounting of the horizontal arm 25 in the bearings 24 provides for a limited vertical turning of the gathering conveyor 9, while the mounting of the vertical stem 26 in the extension 28 provides for the requisite motion in the horizontal direction.

The resulting swivel connection affords sufficient freedom of the gathering conveyor 9 to adapt itself to variations in the ground level.

As the pineapples 23 are advanced inwardly of the apparatus (arrows b, Figs. 1 and 2) they first encounter a guide 38 (Fig. 2). The workmen are supposed to exercise care in emplacing the pineapples upon the conveyor 9 so that the stem ends will face forwardly. Said ends then ride across the guide 38, and inasmuch as the latter is pitched inwardly of the conveyor it follows that the pineapples will be properly aligned with the primary trimming knife 39, which is located contiguously to the shoulder 40 of the guide. The function of the knife 39 is to produce a clean cut across the but or root end as at 41. The root end 42 thus drops off. This function is achieved by setting the knife 39 in from the shoulder 40, the lateral distance between the highest point of the shoulder and the plane of the knife 39 representing the amount that is cut off from the base of the pineapple.

A shaft 43 carries the knife 39. Said shaft is journaled in bearings 44, 45, which extend up from the conveyor framework. The bearing 45 has a large lateral loop 46 which makes room for the foliage 47 of the pineapple. The shaft 43 carries a pulley 48 which is belted at 49 to a driver pulley 50. The latter is carried by the cross shaft 14 of the conveyor and inasmuch as the driver is much larger than the pulley 48 it follows that the latter will revolve at a much higher rate of speed. In practice this will be made adequate to secure clean cuts as the pineapples pass by.

Inasmuch as the gathering conveyor 9 must be left extended during transportation of the apparatus from one field to another, use is made of a demountable wheel 51 at the approximate extremity of the conveyor 9 (Fig. 1). This wheel is journaled in the fork 52 of an arm 53 which depends from the underside of the conveyor framing. At that point said arm is secured by means of a nut and bolt 54. This connection is desirably made separable to afford the demountable feature of the wheel 51, so that the latter can be removed from the apparatus if and when desired. However, under ordinary circumstances said wheel is an asset inasmuch as it relieves a great deal of strain from the cable by which the free end of the conveyor 9 is adapted to be suspended, when the wheel is permitted to ride the ground.

Power for the operation of the gathering conveyor 9 is derived from a countershaft 55 (Fig. 2) which has a chain and sprocket wheel connection 56, 57, with the cross shaft 14. This connection synchronizes the motion of the gathering conveyor 9 with a fruit elevator 58 (Fig. 1). Said elevator comprises a pair of chains 59 which are trained over pairs of sprockets 60, 61, respectively on the countershaft 55, and a cross shaft 62 in a matching position at the top of a standard 63. The chains 59 carry troughs 64 at intervals. The spacing of these troughs matches the spacing of the pockets 22 between the cross pieces 19. This circumstance makes evident the need for synchronization between the gathering conveyor 9 and the first elevator 58.

As the pineapples 23 (Fig. 1) advance along the conveyor 9 they ultimately reach the full line position c, whence they roll off into the dotted line position d. One of the troughs 64 will then be in the act of rising, and since the two elements are synchronized as stated, the pineapple will roll gently into the trough without any danger of being bruised or crushed. The troughs 64 are ended, so to speak, by a guide 65, which is slotted at 66 (Fig. 1). The purpose of the guide is to provide an abutment for the foliage end of each pineapple.

This function is illustrated in Figs. 3 and 4. The angle irons which comprise the guide 65 are rounded rather fully at 67 to provide rests for the contiguous end 68 of the pineapple. The foliage 47 is intended to project through the slot 66 which the spacing of the angle irons affords. The two angle irons are firmly connected so as to maintain said spacing, but at least one of the connections 69 is of loop form so as to allow for the passage of the foliage.

The pineapples 23 are pushed over toward and into the guide 65 by a series of packers 70 (Fig. 3). Each of these comprises a pusher which is adapted to allow for a variety of lengths and to exercise pressure on the previously trimmed base end so as to properly emplace each pineapple in respect to a rapidly rotating secondary trimming knife 71. This knife is carried by a shaft 72 which is journaled in brackets 73. These brackets are a part of the standard 63 and in practice the latter may consist of a framework somewhat on the order of the framework of the conveyor 9, the elements thereof being braced at 74 (Fig. 3) to produce a perfectly stable structure.

The driving of the knife 71 is accomplished by pulley and belt connections 75, 76 (Fig. 3). The pulleys are carried by the conveyor and knife shafts 62, 72. The former pulley is largest, thereby providing for the speed necessary for the proper operation of the knife 71. The latter operates directly in back of the guide 65 (Fig. 4) so that the foliage 47 is removed with a clean cut (arrow e, Fig. 3) as each pineapple is brought into position. As seen in Fig. 3 the flange of the outermost angle iron is cut away at 77 so as not to interfere with the motion of the knife.

Each of the packers 70 comprises a blade 78 pivoted at 79 to a fixedly mounted stud 80 that projects out from the standard 63. The pivotal mount 79 may comprise a sleeve that is turnably carried by the stud. An arm 81 extends off from this sleeve and it provides the anchorage for one end of a spring 82, the other end of which is anchored elsewhere, preferably to the blade 78 next highest.

Thus, as each blade 78 is depressed (arrow f, Fig. 3) the resulting motion of the respective arm 81 (arrow g) expands the attached spring 82, but in doing so swings the packer next highest inwardly to a slight degree (arrow h).

Thus while one of the packers is occupied with pushing a pineapple over to the right to the foliage trimming position, the packer next highest is moved inwardly to insure its standing in the farthest in waiting position and in readiness for the pineapple when the latter is elevated into the range thereof.

With respect to the highest packer 70, it is necessary to anchor the respective spring 82 somewhere on the standard 63, for example, to the nearest bracket 73. Each of the troughs 64 is slotted at 83 (Fig. 5) to pass the series of packers 70. These slots are central of the troughs, and since they obviously are intended to match the positions of the packers, it follows that the latter will exercise their pressure more or less directly against the center of the butt of the pineapple. This, in turn, insures the best possible positioning of the pineapple for the trimming off of the foliage.

Following the cutting off of the foliage 47, which completes the trimming operation, the pineapple passes over the crown of the elevator 58 (arrow i, Fig. 1) and falls into a grader 84 (Fig. 1) by way of a curved chute 85, other details of the grader being omitted from this disclosure.

The operation is readily understood. The gathering conveyor 9 extends out from one side of the base 6 so as to sweep over the rows of plants. As the workmen who walk the lanes between the rows of plants pick the pineapples they place them in the pockets 22 (Fig. 1) whereupon they are transported first past the primary trimming knife 39, whence they are delivered to the fruit elevator 58 for another trimming by the secondary knife 71. The root or butt and foliage ends are thus carefully trimmed.

It has been pointed that the actions of the gathering conveyor 9 and the elevator 58 are timed so that successive troughs 64 will properly come into registration with the pockets 22 in order to enable a virtual rolling of the pineapple across the gap. The function of the packers 70 is of no less importance because it is by means of these that variations in the axial length of the pineapple stock are accounted for, insuring an adequate pushing over of all sizes of pineapples against the guide 65 so that the foliage 47 will be cut off far enough down.

I claim:

1. Harvesting apparatus comprising a mobile base adapted to be transported over a field of fruit, means on the base for receiving the picked fruit, a gathering conveyor extending from said base for the delivery of said fruit to the receiving means, said conveyor consisting of a frame, a member movable on the frame for the transportation of the fruit, means embodied in said member providing fruit pockets at regularly spaced intervals, trimming means operable above the movable member to cut off one end of each fruit as it passes, and guide means carried by the frame contiguously to the trimming means and projecting across the path of the moving fruit and engageable by the fruit for moving the fruit longitudinally of the pockets for properly placing the fruit for the trimming means.

2. Harvesting apparatus comprising a mobile base adapted to be transported over a field of fruit, means on the base for receiving the picked fruit, a gathering conveyor extending from said base for the delivery of said fruit to the receiving means, said conveyor consisting of a frame, a member movable on the frame for the transportation of the fruit, means embodied in said member providing fruit pockets at regular intervals, trimming means to cut off one end of each fruit, guide means adjacent to the trimming means adapted to be engaged by the fruit for progressively moving the fruit lengthwise of the pockets for properly positioning the end to be trimmed in reference to the trimming means, and a bearing structure for the trimming means upstanding from the frame and including a loop to allow for the unobstructed passage of the other and untrimmed end of the fruit if said end happens to project beyond the movable member.

3. Harvesting apparatus comprising a mobile base adapted to be transported over a field of fruit, a gathering conveyor extending out from said base for the reception and delivery of said fruit, an elevator carried by the base, and located contiguously to one end of the gathering conveyor, trimming means with which both the conveyor and elevator are supplemented to operate upon different portions of a fruit, pocket means for the fruit distributed at regular intervals throughout the gathering conveyor, troughs embodied in said elevator being spaced to agree with the distances between pockets, means each associated with the conveyor and elevator for moving the fruit toward the trimming means, means for holding the fruit in proper position for the trimming operation, and means for driving the conveyor and elevator in synchronism to periodically register the pockets with the troughs.

4. Harvesting apparatus comprising a mobile base adapted to be transported over a field of fruit, means on the base being situated at an elevation therefrom for receiving the picked fruit, an elevator carried by and operable on the base for delivering the fruit to the receiving means, said elevator including troughs for carrying the fruit, trimming means for trimming the fruit prior to its delivery to the receiving means, guide means providing an abutment for the fruit during trimming, and means for sliding the fruit along each trough to insure engagement of the fruit with the guide means and proper registration with the trimming means.

5. Harvesting apparatus comprising a mobile base adapted to be transported over a field of fruit, receiving means for the fruit being carried by the base at an elevation therefrom, an elevator carried by and operable on the base including troughs for elevating the fruit for delivery to the receiving means, trimming means for cutting off at least one end of each fruit, a fixed guide providing an abutment adjacent to the trimming means and being slotted to allow portions of said end to project through, and at least one packer means to push each fruit over in its trough during its passage for delivery, thereby to engage said end with the guide and insure its registration with the trimming means.

6. Harvesting apparatus comprising a mobile base adapted to be transported over a field of fruit, fruit receiving means on the base being supported at an elevation therefrom, an elevator operable on the base and including troughs for the delivery of the picked fruit to the fruit receiving means, each of the troughs having a slot, packer means for pushing the fruit over in the respective trough during operation of the elevator, consisting of a pivoted blade adapted to pass through the slot during said passage, and having an attached spring for yieldably doing the pushing, fixed guide means with which the contiguous end of the fruit is abutted by virtue of said pushing, being slotted to let portions of said contiguous end project through, and trimming means working next to the guide means to cut off the projections of the fruit.

7. Harvesting apparatus comprising a mobile base adapted to be transported over a field of fruit, fruit receiving means on the base and at an elevation therefrom, an elevator for delivering the fruit to said receiver means, including slotted troughs to carry the fruit as picked, at least two packers consisting of independently pivoted blades to pass through the slots of the troughs during operation of the elevator, springs actuating the blades to exercise a pushing action on the fruit, one of the springs being mutually connected to both blades, a rigid guide with which the fruits are abutted by said pushing action, being slotted to let portions of the fruits project through, and trimming means operating on the outside of the guide means to cut off the projections.

KERMIT J. JACKSON.